Patented May 19, 1936

2,040,944

UNITED STATES PATENT OFFICE 2,040,944

PROCESS FOR PRODUCING POLYHYDROXY ALCOHOLS

Wilbur A. Lazier, Marshallton, Del., assignor to E. I. du Pont de Nemours & Company, Wilmington, Del., a corporation of Delaware No Drawing. Application September 22, 1933, Serial No. 690,568

13 Claims. (Cl. 260—156.5)

This invention relates to the production of alcohols and more particularly to the conversion of esters of polybasic acids to the corresponding alcohols.

This application is a continuation in part of my co-pending applications, Serial No. 445,224, filed April 17, 1930 and Serial No. 629,754, filed August 20, 1932.

Until comparatively recent years the successful reduction of acids to the corresponding alcohols depended upon the tedious and expensive treatment of the acid in absolute alcohol solution with metallic sodium, typified in general by the method of Bouveault and Blanc (Chemisches Centralblatt 1904, II, 184; 1905, II, 1700). The advent of methods of catalytic hydrogenation has made it possible to produce desired alcohols with economy. In the previously mentioned co-pending applications, processes are described for the conversion of esters of carboxylic acids to the corresponding alcohols.

Continued investigation of ester hydrogenation has led to the discovery of new and important variations of the earlier methods. I have found that higher monohydric alcohols such as butanol are much more readily esterified with solid acids than ethanol due to their higher boiling points and the ease with which water may be removed as a binary mixture with the alcohol. Additionally, esters with long chain alcohols appear to hydrogenate more readily than the corresponding ethyl esters.

An object of this invention is to provide an economical process for the conversion of polybasic acids to the corresponding polyhydric alcohols. A specific object of the present invention resides in the conversion, by catalytic hydrogenation, of esters of polybasic acids and monohydric alcohols, said alcohols being substantially immiscible with water, to the corresponding polyhydric and monohydric alcohols. Other objects will appear hereinafter.

These objects are accomplished by the following invention which in its general aspects comprises forming an ester of the polybasic acid with a higher alcohol, admixing the ester thus formed with hydrogen, and heating the ester-hydrogen mixture in the presence of, and in contact with, a hydrogenating catalyst comprising either a single hydrogenating metal or its oxide, or a mixture of reduced hydrogenating metals and their oxides at an elevated temperature and pressure.

In the following examples I have set forth several of the preferred embodiments of my invention, but they are presented for purposes of illustration and not as limitations.

Example 1

The butyl ester of succinic acid is prepared as follows: A mixture containing 2360 grams of succinic acid, 3260 grams of butyl alcohol and 30 grams of sulfuric acid, is heated to boiling in an apparatus designed to separate the water from the distillate and to return the butyl alcohol to the reaction vessel. Distillation is continued until the theoretical amount of water has been removed and the acid number reduced to a very low figure. The product is washed with sodium carbonate solution to remove the acid and the crude butyl succinate used for hydrogenation without further treatment.

A hydrogenation catalyst is prepared as follows: 1500 grams of copper nitrate is dissolved in 4 liters of water and mixed with a solution containing 1000 grams of ammonium chromate in an equal volume of water. Ammonium hydroxide is added to neutralize the acidity developed during precipitation of the copper ammonium chromate. The precipitate is washed by decantation, filtered, and dried, after which it is ignited at a temperature of 400° C. The resulting copper chromite powder is used for the hydrogenation of esters without further treatment.

3636 grams of crude butyl succinate prepared in the manner described above and 300 grams of copper chromite, prepared as described above, are charged into an autoclave equipped for agitation. Hydrogen is introduced until a pressure of 3000 pounds per square inch is attained, and the mixture is heated to 255° C. and vigorously agitated for 4 hours, after which the absorption of hydrogen is observed to cease. The products of hydrogenation have a decided odor of tetrahydrofurane, and a preliminary distillation yields 378 grams of this compound boiling at 67°–70° C. The remaining portion is then boiled with 90 grams of sodium hydroxide and added water. Distillation of the mixture yields 527 grams of tetramethylene glycol boiling at 115°–118° C. at 6 mm. The butanol is recovered by acidification and distillation. Calculating the tetrahydrofurane as tetramethylene glycol I obtain a total yield of 995 grams or 69% of the theoretical amount.

Example 2

The butyl ester of glutaric acid is prepared as follows: A mixture containing 132 grams of glutaric acid, 163 grams of butyl alcohol, and 2 grams of sulfuric acid is heated in an apparatus such as used in Example 1. The crude butyl glutarate is washed free of acid with sodium carbonate solution and used directly for hydrogenation.

Copper chromite prepared as in Example 1, is extracted twice with 10% acetic acid, washed, and dried.

250 grams of crude butyl glutarate prepared as described, and 20 grams of the extracted copper chromite are agitated in a shaking autoclave at 250° C. and a hydrogen pressure of 3,000 lbs. per square inch for 8 hours. The saponification number of the hydrogenated mixture indicates a 93.8% conversion to pentamethylene glycol and butanol. The hydrogenation products are treated with sodium hydroxide and distilled. 60 grams of pentamethylene glycol boiling at 129°–130° C. at 9 mm. is obtained.

*Example 3*

The methoxyethyl ester of adipic acid is prepared as follows: A mixture containing 146 grams of adipic acid, 160 grams of methoxyethanol, 75 grams of toluol, and 2 grams of sulfuric acid is heated to boiling in an apparatus designed to separate the water from the distillate and return the organic solvent to the reaction vessel. After 6 hours heating approximately 95% of the adipic acid has been esterified. The product is washed with potassium carbonate solution until acid free and the crude methoxyethyl adipate used as described below.

A barium copper chromite catalyst is prepared as follows: 26 grams of barium nitrate is dissolved in 800 cc. of warm water, and 218 grams of copper nitrate ($3H_2O$) is added and stirred until dissolved. The solution is heated at 70° C. until the precipitate of barium nitrate that may have formed on addition of the copper nitrate redissolves. 126 grams of ammonium bichromate is dissolved in 600 cc. of water and 150 cc. of 28% ammonium hydroxide. The second solution is added to the first stirring constantly. Ammonium hydroxide is added to just neutralize any acidity developed during precipitation. The precipitate is filtered, dried at 110° C. and then ignited at 350°–450° C. for one hour. The residue is powdered, and extracted twice with 10% acetic acid. After washing, filtering, drying at 110° C., and powdering, the catalyst is ready for use.

213 grams of methoxyethyl adipate and 17 grams of barium copper chromite catalyst, prepared as described, are agitated in a shaking autoclave for 11 hours at a temperature of 255° C. and a hydrogen pressure of 3000 pounds per square inch. A 96% conversion to hexamethylene glycol and methoxyethyl alcohol is indicated by the saponification number of the hydrogenated mixture. The hexamethylene glycol is separated by careful vacuum distillation.

Starting with isobutyl alcohol and hexahydro phthalic acid and esterifying in the manner described in the above examples, crude isobutyl hexahydrophthalate is obtained. Upon hydrogenating as described for the other esters, isobutyl alcohol and hexahydro phthalyl alcohol are obtained.

*Example 4*

The mono butyl ester of camphoric acid is prepared by heating 179 grams of champhoric anhydride with 81 grams of butyl alcohol. Camphoric acid may also be used and the water formed removed by distillation as in previous examples. As the di-ester forms only with difficulty, the esterification product will be substantially mono butyl camphorate.

A composite hydrogenation catalyst is prepared as follows: A solution is prepared by dissolving 245 grams of crystallized zinc nitrate, 25 grams of cadmium nitrate, and 25 grams of copper nitrate (trihydrate) in about 750 cc. of water. A second solution is prepared by dissolving 100 grams of chromic anhydride ($CrO_3$) in 500 cc. of water and then adding 135 grams of 28% ammonium hydroxide. Precipitation of the hydrogenating metals of the first solution as chromates is effected by stirring and adding, at room temperature, the second solution. The mixture is exactly neutralized with additional ammonium hydroxide and allowed to settle. The precipitate is washed several times by decantation with water, filtered, and dried at 100° C. Then by igniting the filter cake at 400° C. for 4 hours, the double ammonium chromates of copper, zinc, and cadmium are converted to metallic chromites, in which form they are employed as catalysts after powdering, briquetting, and finally crushing.

12 cc. of the composite hydrogenating catalyst made as described is placed in a high pressure reaction tube and a mixture containing 63.5% of crude monobutyl camphorate, made as described above, and 36.5% of normal butyl alcohol is pumped over it together with an amount of hydrogen equal to 17 times that necessary for complete reduction of the ester. The temperature is maintained at 400° C. and the hydrogen pressure is maintained at 3,000 pounds per square inch. The solution is pumped through the reaction tube at the rate of 48 grams per hour. The ester-butanol solution is converted to the vapor phase in a preheater before passing into the reaction tube. Upon leaving the reaction tube, the liquid products are separated from the hydrogen gas stream by condensation. A 2.5 hour accumulation of this condensate weighs 160 grams and the saponification number indicates 63% conversion of the monobutyl camphorate to the corresponding polyhydric alcohol.

Although certain definite conditions of operation such as temperature and pressure have been indicated in the above examples, it will be apparent that these factors may be varied within wide limits within the scope of this invention. The temperature may range from 200° to 500° C. The preferred temperature range is 230° to 400° C., depending somewhat on the catalyst composition selected and the method used for carrying out a given reaction. The success of the process also depends upon the use of an elevated pressure in excess of 50 atmospheres while the preferred pressure is between 100 and 250 atmospheres. The maximum pressure which can be used is limited only by the strength of the reaction apparatus. It is to be understood that the invention is not limited to the use of these specific pressures, since they may be varied depending upon the ester treated and the amount of conversion desired. As the pressure is decreased, it will be evident that the conversion to alcohols will decrease in accordance with the well known law of mass action.

It will be apparent from the above examples that either the batch or continuous method of hydrogenation may be employed in carrying out the processes of this invention. When the ester is pumped over the catalyst, the rate of flow is determined by the activity of the catalyst and the molecular weight of the ester. An active hydrogenating catalyst will ordinarily convert 8 times its volume of ester per hour. The ratio of hydrogen to ester used may be varied over a wide range, preferably about 5 to 20 moles of hydrogen per mole of ester.

Either the liquid phase or vapor phase may be used successfully in the hydrogenation step of this invention, depending largely upon the ester to be hydrogenated.

It will be apparent from the examples given that chromite catalysts are preferred in this invention, but many other catalysts may be used successfully. For example reduced metals, such as silver, copper, tin, cadmium and lead, and in certain cases iron, cobalt or nickel may be used. Good results are obtained with fused copper oxide, either wholly or partially reduced. The copper catalyst may be promoted with oxide promoters, such as manganese oxide, zinc oxide, magnesium oxide or chromium oxide. These promoted catalysts may be physical mixtures or chemical compounds containing copper, e. g., copper chromate or chromite. Metallic catalysts in the form of a powder may also be used, in which case it is advisable to employ a suitable supporting material such as silica, activated carbon, alumina or a naturally occurring earth such as kieselguhr. It has been found that elementary nickel supported on kieselguhr and prepared by reduction of the hydroxide or carbonate may be used for the hydrogenation of certain esters, provided a sufficiently high temperature and pressure are used. Such a catalyst, however, has the disadvantage that it has a tendency to carry the hydrogenation completely to hydrocarbons rather than to the more desirable alcoholic intermediate compounds.

Certain metallic oxides belonging to the class known as difficultly reducible oxides and having both hydrogenating and dehydrogenating propensities may be employed. By the term difficultly reducible is meant that the oxides are not substantially reduced to metal by prolonged exposure in a state of purity to the action of hydrogen at atmospheric pressure and at a temperature of 400–450° C. Such oxides suitable for the hydrogenation of esters are zinc oxide, manganese oxide, magnesium oxide, etc. These oxides may be employed either alone or in combination with each other or with other oxides which have a promoting action. Preferably the oxide employed as a promoter for the hydrogenating oxide has little activity of itself or is much less active than the hydrogenating oxide employed with it, but it yet serves to further promote the activity of the more active oxide.

It will be noted that the hydrogenating oxides are, in general, of a basic character. The promoting oxides are preferably chosen from the group consisting of the more acidic oxides of elements selected from the higher groups of the periodic table. For example, the oxides of chromium, vanadium, tungsten, titanium, and molybdenum are suitable promoters for zinc oxide or manganese oxide. Of these, chromium oxide is preferred, since it inhibits more the tendency towards catalyzing destructive side reactions. I have found it advantageous to use chromium oxide in physical admixture or in chemical combination, e. g., as a chromate or chromite, with a large number of oxides ordinarily regarded as easily reducible. The acidic promoting oxides other than chromium oxide may also be used either in physical admixture or in chemical combination, e. g., as tungstates, vanadates, molybdates, etc. The reducible oxides when combined or otherwise associated with chromium oxides are only partially reduced under conditions of operation and are found to be very effective catalysts for the hydrogenation of esters. The oxides of cadmium, copper, tin, and bismuth are all examples of oxides that may be employed in the more difficultly reducible form. Catalysts consisting of both reduced metals and non-reduced oxides are active even though the reaction is carried out at a temperature above the fusion point of the metal. Such mixed catalysts are conveniently employed initially in the form of chromates or chromites of the metals. Basic zinc chromate when partially reduced with hydrogen is a suitable catalyst for the hydrogenation of esters by virtue of its high activity and absence of side reactions. It may be prepared by treating zinc oxide with chromic acid, by precipitation of the zinc salt with an alkali chromate or by any other suitable means. Manganese oxide-chromium oxide mixtures are also suitable as well as copper oxide in combination with chromium oxide or other acidic oxides.

In carrying out the hydrogenation of esters, I may use any one of the catalysts previously disclosed in my copending application No. 285,501, filed June 14, 1928. These catalysts are included among those outlined in the preceding paragraph. A preferred catalyst containing a single hydrogenating metal oxide may be prepared according to the general method described in U. S. Patents 1,746,782 and 1,746,783. This latter type of catalyst is prepared by ignition of a hydrogenating metal chromate, or a hydrogenating metal ammonium chromate, or it may be prepared by reduction by hydrogen of the said chromates at a temperature of 500° C. or higher. Particularly good results have been obtained in ester hydrogenation by preparing a catalyst according to the method of U. S. Patent 1,746,783 wherein a double ammonium chromate of a hydrogenating metal is heated at about 600° C. to form a chromite catalyst. As indicated in the examples success has attended the use of mixtures of the chromites of two or more hydrogenating metals. The multiple chromite catalyst compositions described in the examples and disclosed in my copending application Serial No. 470,238, filed July 23, 1930, are eminently suited to use in the present invention. The multiple chromite catalyst compositions described in the said copending application may be prepared by precipitation of a mixture of chromates from solution by adding an alkali metal chromate to an aqueous solution of a mixture of hydrogenating metal salts, followed by ignition or by high temperature treatment with hydrogen. I prefer to use a chromite composition consisting substantially of zinc chromite but containing lesser quantities of the chromates or chromites of copper and cadmium. The activity of chromite catalysts may be further enhanced by subjecting the ignited chromites to an acid extraction process which serves to remove from the composition a portion of the hydrogenating metallic oxide which is not combined with the promoter oxide.

The advantages attending the use of difficultly reducible oxides or reducible oxides in a difficultly reducible form are several and substantial. These catalysts possess a high activity and are sturdy in character. They are relatively immune to degenerative processes such as sintering or poisoning, being thus distinguished from metal catalysts which deteriorate rapidly when subjected to excessive heating. Unlike certain metal catalysts, they possess a small tendency to carry the hydrogenation beyond the alcohol stage, for example to the production of the corresponding hydrocarbon.

I wish to make mention of the utility of catalysts containing copper oxide promoted by chromium oxide either in physical mixture or in chemical combination as copper chromate or copper chromite. This catalyst is particularly useful for liquid phase ester hydrogenation reactions.

The catalysts described above, in addition to the modified copper-chromium catalysts last mentioned, may be modified or promoted by the addition of oxides or carbonates of alkali metals or of alkaline earth metals, or of basic compounds of alkali metals or of alkaline earth metals, that is, compounds of these alkali-forming metals with acids which are weaker than the metal hydroxide. Other suitable promoters are compounds containing an alkali or alkaline earth metal combined with the acid radical of an oxygen-containing acid, e. g., barium chromate. These compounds will all be classified under the term "basic compounds of alkali-forming metals". One tendency of the basic promoter is to suppress the further hydrogenation to hydrocarbon of the formed alcohol.

From the above examples it will be apparent that the methods of the present invention are applicable to the conversion of polybasic aliphatic, alicyclic, and hydroaromatic acids to the corresponding polyalcohols. Such acids are: hexahydrophthalic, azelaic, sebacic, succinic, suberic, pimelic, nonanedicarboxylic, decamethylenedicarboxylic, brassylic, dodecamethylenedicarboxylic, hexadecamethylenedicarboxylic, adipic and camphoric. The process is also applicable to the higher monohydric esters of polybasic hydroxy, aldehydic, and ketonic acids thereby yielding useful glycols. The processes may also be applied to the treatment of mixed acids or esters where for example, mixed polybasic acids are esterified with butyl alcohol and hydrogenated without separation to produce mixed glycols and butanol.

The above mentioned esters of polybasic acids may be mono-esters, or poly-esters as the case may be. Acid anhydrides are esterified to the mono-esters by simple heating and frequently this step may be combined directly with the hydrogenation, as usually the esterification will be complete before the temperature desired for hydrogenation is reached.

The alcohols which may be used, in accordance with this invention, in the esterification step are those substantially immiscible with water; included in this group are butyl, amyl, hexyl, actyl, decyl, dodecyl, tetradecyl, cetyl, ricinoleyl, octadecyl and 9, 10-octadecenyl alcohols and the branch-chain alcohols having 4 or more carbon atoms and produced, for example, in the methanol synthesis from the catalytic hydrogenation of carbonic oxides.

It has been found desirable to use the crude esters, obtained from esterification, directly in the hydrogenation step, as they frequently are converted more easily than carefully refined esters.

Many polycarboxylic acids and their derivatives occur abundantly in nature, while the corresponding polyhydric alcohols are found rarely, if at all. By application of the process of this invention, it is now possible to prepare polyhydric alcohols from the corresponding acids mentioned above, by first converting the acids to esters with certain higher monohydric alcohols and hydrogenating the esters under pressure. The usual chemical reducing agents are expensive and have rendered the production of rare alcohols uneconomical and impractical, but by the use of the present invention this obstacle has been removed, thereby widening the use of these comparatively rare materials in the art.

Important advantages of my invention reside in the greater ease of hydrogenation of esters formed from the higher alcohols, and also in the much greater facility of esterification of acids and their derivatives with higher alcohols.

The above description and examples are to be construed as illustrative only and not as limiting the scope of the invention. Any modification or variation therefrom which conforms to the spirit of the invention is intended to be included within the scope of the claims.

I claim:

1. The process of converting a non-aromatic polybasic acid having more than one carbon atom per carboxyl group to a polyhydric alcohol which comprises substantially completely esterifying the acid with a monohydric aliphatic alcohol having at least four carbon atoms, then reacting a mixture of the resulting product and hydrogen at a temperature in excess of 200° C. and a pressure in excess of 50 atmospheres in the presence of a hydrogenation catalyst.

2. The process of claim 1, characterized in that the pressure is above 100 atmospheres.

3. The process of claim 1, characterized in that the temperature is 230–400° C.

4. The process of claim 1, characterized in that the catalyst is a member of the class consisting of the hydrogenating metals and their oxides promoted by the presence of a more acidic metal oxide.

5. The process of claim 1, characterized in that the catalyst is a member of the class consising of the hydrogenating metals and their oxides promoted by the presence of chromium oxide.

6. The process of claim 1, characterized in that the polybasic acid is dibasic acid.

7. The process of claim 1, characterized in that the polybasic acid is an aliphatic dibasic acid.

8. The process of claim 1, characterized in that the polybasic acid is a hydro-aromatic dibasic acid.

9. The process of claim 1, characterized in that the polybasic acid is an acid selected from the group consisting of hydroxy, aldehydric, and ketonic acids.

10. The process of claim 1, characterized in that an excess of hydrogen is used.

11. The process of claim 1, characterized in that the reaction takes place in the liquid phase.

12. The process of claim 1, characterized in that the reaction takes place in the vapor phase.

13. The process of converting a non-aromatic dibasic acid having more than one carbon atom per carboxyl group, to a dihydric alcohol which comprises substantially completely esterifying the acid with an alcohol having at least four carbon atoms, then reacting a mixture of the resulting product and hydrogen at a temperature of 230° to 400° C. and a pressure of 100 to 250 atmospheres in the presence of a hydrogenating metal chromite catalyst.

WILBUR A. LAZIER.

CERTIFICATE OF CORRECTION.

Patent No. 2,040,944.  May 19, 1936.

WILBUR A. LAZIER.

It is hereby certified that error appears in the printed specification of the above numbered patent requiring correction as follows: Page 4, second column, line 56, claim 9, for "aldehydric" read aldehydic; and that the said Letters Patent should be read with this correction therein that the same may conform to the record of the case in the Patent Office.

Signed and sealed this 1st day of September, A. D. 1936.

(Seal)

Leslie Frazer
Acting Commissioner of Patents.